United States Patent [19]

Palmer

[11] 4,069,083
[45] Jan. 17, 1978

[54] BONDING MATERIAL AND METHOD

[75] Inventor: David Nelson Palmer, Tolland, Conn.

[73] Assignee: Combustion Engineering, Inc., Windsor, Conn.

[21] Appl. No.: 643,065

[22] Filed: Dec. 22, 1975

[51] Int. Cl.² .............................................. C09J 5/00
[52] U.S. Cl. ..................................... 156/329; 73/644; 252/351; 252/514; 252/511; 252/515; 252/513; 252/516; 260/33.6 SB; 260/448.2 N; 260/37 SB; 260/825; 260/46.5 E
[58] Field of Search ........................ 156/329; 428/447; 252/511, 515, 513, 516, 514, 351; 260/25, 46.5 E, 825, 37 SB, 33.8 SB, 448.2 N, 33.6 SB; 176/19 R; 73/67, DIG. 1, 71.5 US, 552; 427/387

[56] References Cited

U.S. PATENT DOCUMENTS

| | | | |
|---|---|---|---|
| 3,388,093 | 6/1968 | Heying et al. | 260/37 SB |
| 3,394,586 | 7/1968 | Cross | 73/71.5 US |
| 3,463,801 | 8/1969 | Papetti et al. | 260/46.5 E |
| 3,501,435 | 3/1970 | Larchar et al. | 260/37 SB |
| 3,607,832 | 9/1971 | Hansen | 260/37 SB |
| 3,637,589 | 1/1972 | Kwasnik et al. | 260/46.5 E |
| 3,639,274 | 2/1972 | Brandt et al. | 252/514 |
| 3,763,694 | 10/1973 | Rathburn et al. | 73/71.5 US |
| 3,883,609 | 5/1975 | Larchar et al. | 260/37 SB |

OTHER PUBLICATIONS

Drury "Isotope Separation", Kirk–Othmer Encyclopedia of Chemical Technology vol. 14, © 1967, pp. 85–87.

Primary Examiner—Charles E. Van Horn
Assistant Examiner—J. J. Gallagher
Attorney, Agent, or Firm—Richard H. Berneike

[57] ABSTRACT

A bonding material is disclosed which is stable at high temperature and radiation levels, which may be conductive and which is particularly suited as a couplant to ultrasonically and electrically couple an ultrasonic or acoustic transducer to a surface. The material comprises a carborane polysiloxane adhesive, a vehicle-solvent which will evaporate such that the bonding material cures by vehicle-solvent release, and a wetting agent. The material may also contain conductive materials which are suitable for the conditions of intended use and may also be enriched in $B^{11}$ to avoid the adverse effects of $B^{10}$ when subjected to radiation.

8 Claims, No Drawings

BONDING MATERIAL AND METHOD

BACKGROUND OF THE INVENTION

The present invention relates to a bonding composition and more particulary to a method of attaching an ultrasonic transducer to a surface with the bonding composition. It is frequently necessary to bond ultrasonic transducers to surfaces in an environment in which the bonding material will be subject to high temperatures and radiation. One example is the ultrasonic transducers which are used to monitor the vibration of a core barrel in a nuclear reactor. The bonding material in these situations may be subjected to temperatures as high as 600° F and radiation levels as high as 50R (Roentgen) per hour. Investigations have shown that conventional, commercially available ultrasonic couplants are unsuitable for such conditions. For example, the commonly available colloidal grease type couplants will exhibit an excessive degree of thermal outgassing with eventual loss of physical properties and loss of mechanical bonding. Such changes would initially lead to constantly changing ultrasonic modulation which could generate erroneous ultrasonic data. Based on outgassing data, the in-service lift of common high temperature couplants would be no greater than 700 hours at the temperatures encountered in nuclear reactor service. It is further estimated that under irradiation conditions, and with subsequent loss of adhesion and mechanical properties due to both the thermal and irradiation embrittlement the useful service life of commercial couplants would be no greater than 50 hours. Because of this relatively short predicted service life, frequent changing of the couplant would be necessary. Radiation exposure levels as well as inaccessiblity of the monitoring sites would make such a practice prohibitive.

Alternatives to the collodial grease type couplants which have been considered are alloys solder bonding systems, thermosetting resin systems and ceramic adhesives all with little or no success in such an environment. One method of coupling which has been developed for use at the high temperature and radiation level referred to above employs a room temperature vulcanizing material formed from either vinyl methyl siloxane or polyphenyl siloxane. The special compounding of these materials makes them temperature and radiation stable and conductive so that the couplant also serves as one of the electrical connections to the transducer. This method of coupling is disclosed and claimed in the co-pending patent application of the present inventor, Ser. No. 517,972 filed Oct.25, 1974, now U.S. Pat. No. 3,970,504.

SUMMARY OF THE INVENTION

An object of the present invention is to provide an improved bonding material which is stable at high temperature and radiation levels and which also may be conductive. Another object of the present invention is to provide a method of adhering and ultrasonically and electrically coupling an ultrasonic transducer to a surface with said improved bonding material. The bonding material has extremely stable ultrasonic signal attenuating properties. The invention is accomplished through the use of a carborane polysiloxane selected such that it is thermally stable at the desired temperature operating range and is of such a molecular weight that is miscible or soluble in a vehicle and has adhesive properties. The carborane polysiloxane is carried out in a vehicle-solvent which has a wetting agent added thereto and which may also contain a conductive material and can be enriched with $B^{11}$ instead of the natural $B^{10}/B^{11}$ isotopic composition. The material is used as an adhesive which cures by solvent release.

DESCRIPTION OF THE PREFERRED EMBODIMENT

Carborane polysiloxanes are a group of materials which are prepared by reacting a carborance of the desired structure with a siloxane of the desired structure. Several types of these carborane polysiloxanes and their method of manufacture are described in detail in U.S. Pat. Nos. 3,388,091 and 3,388,093.

The invention may employ as the binder a single carborane polysiloxane or a mixture of several different carborane polysiloxanes. The carborane polysiloxanes employed must each have a chemical and molecular structure which is thermally stable at the desired operating temperature and miscible or soluble in the vehicle-solvent. Furthermore, the carborane polysiloxane or combination of carborane polysiloxanes must be in a molecular weight range such that the resultant product has adhesive properties and will bond to a substrate; i.e., the molecular weight must be low enough so that the material is tacky rather than hard and it must be high enough so that it is not a liquid. The product must be thioxtropic (capbable of becoming fluid when disturbed such as by pressure) so that it can flow when being applied but will be firm after application. The carborane polysiloxanes or combinations of carborane polysiloxanes which have these properties are referred to herein as "carborane polysiloxane adhesives."

The preferred commercially available carborane polysiloxane adhesive is a carborane methyl silicone polymer containing a multiplicity of structural units of the following formula:

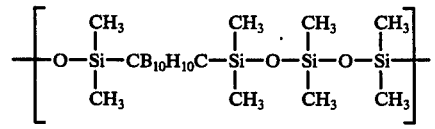

Such a material is commercially available and is sold under the trademark "Dexsil 300 GC" by the Analabs Corporation. This is a waxy solid having an average molecular weight in the range of 16,000 to 20,000. Any of the other carborane polysiloxanes which have the required adhesive properties as noted above may be used.

Combinations of carborane polysiloxanes may also be used. For example, lower molecular weight carborane polysiloxanes may be mixed with the higher molecular weight materials to reduce the viscosity so that the materials can be worked or spread and so that they will wet the surfaces and adhere. Carborane methyl phenyl silicone polymer containing a multiplicity of structural units of the following formula:

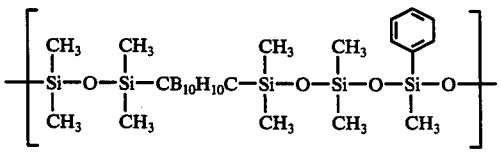

may be used in combination with the solid carborane methyl silicone polymer previously mentioned so as to reduce the viscosity. This carborane methyl phenyl silicone polymer is an opaque, viscous fluid having an average molecular weight in the range of 12,000 to 16,000. Such a material is commercially available and is sold under the trademrk "Dexsil 400 GC" by the Analabs Corporation. Another fluid carborane polysiloxane which is suitable for mixing with the solid materials for viscosity modification is carborane methyl 2-cyanoethyl silicone polymer containing the following structural units:

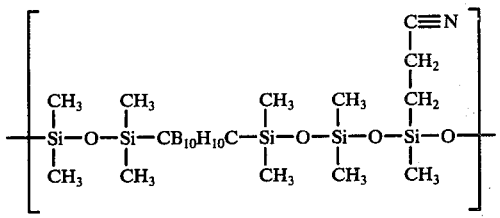

This material is also an opaque, viscous fluid having an average molecular weight of about 9,000 and is sold by Analabs Corporation under the trademark "Dexsil 410 GC."

The formulation of the present invention includes the carborane polysiloxane adhesives as discussed above together with a vehicle-solvent and a wetting agent. The vehicle-solvent is a liquid in which the carborane polysiloxane adhesive is soluble or miscible. The wetting agent serves to promote the adhesion of the material to the surfaces. One formulation of the present invention as well as ranges for the compositon are as follows:

| Component | Function | Preferred Volume % | Range Volume % |
| --- | --- | --- | --- |
| Carborane Methyl Silicone | Adhesive | 45.00 | 25–50 |
| Toluene | Vehicle-Solvent | 54.95 | 75–50 |
| Dimethyl Polyoxyalkylene Ether Siloxane Copolymer | Wetting Agent | 0.05 | 0.05–0.10 |

The above formulation employs a single, waxy, solid carborane polysiloxane adhesive. A formulation employing a mixture of carborane polysiloxanes is as follows:

| Component | Function | Preferred Volume % | Range Volume % |
| --- | --- | --- | --- |
| Carborane Methyl Silicone | Adhesive | 33.30 | 25–50 |
| Carborane Methyl Phenyl Silicone | Viscosity Modifier | 16.70 | 12.5–25 |
| Toluene | Vehicle-Solvent | 49.95 | 62.5–25 |
| Dimethyl Polyoxyalkylene Ether Siloxane Copolymer | Wetting Agent | 0.05 | 0.05–0.10 |

The preferred ratio of the solid carborane methyl silicone to the fluid carborane methyl phenyl silicone is 2 to 1 although this ratio can be varied to obtain the desired viscosity and workability. Also combinations of the liquid carborane polysiloxanes may be used such as follows:

| Component | Function | Preferred Volume % | Range Volume % |
| --- | --- | --- | --- |
| Carborane Methyl Silicone | Adhesive | 33.30 | 25–50 |
| Carborane Methyl Phenyl Silicone | Viscosity Modifier | 8.35 | 6.25–12.5 |
| Carborane Methyl 2-Cyanoethyl Silicone | Viscosity Modifier | 8.35 | 6.25–12.5 |
| Toluene | Vehicle-Solvent | 49.95 | 62.5–25 |
| Dimethyl Polyoxyalkylene Ether Siloxane Copolymer | Wetting Agent | 0.05 | 0.05–0.10 |

The preferred ratio of the two fluid carborane polysiloxanes is 1 to 1 but this ratio may be varied as desired.

Toluene has been disclosed above as the vehicle-solvent for the carborane polysiloxane adhesive but it is to be understood that a variety of the other vehicle-solvents may be used, examples being other unsaturated cyclic hydrocarbons such as benzene, unsaturated cyclic ketones and dialkyl ethers. The criteria for the vehicle-solvent are that the carborane polysiloxane adhesives be soluble or miscible therein and that the vehicle-solvent evaporate from the mixture to cure the adhesive by vehicle-solvent release. The vehicle-solvent must be compatible with the carborane polysiloxane adhesive and not cause a breakdown of the adhesive. Solvent release causes the adhesive to dry or cure to a hard or waxy film.

The wetting agent in the above formulation, dimethyl polyoxyalkylene ether siloxane copolymer, is commercially available such as the material available from the General Electric Company under the trademark "SF-1066." Examples of other wetting agents which can be employed are the methyl alkyl siloxane polymers and the methyl phenyl siloxane polymers.

The formulation is prepared by heating the vehicle-solvent to its boiling point and then adding the carborane polysilixane adhesive in the proper proportion. The mixture is allowed to cool to ambient temperature (around 72° F) and the wetting agent is added.

The formulation is used by spreading and then allowing a majority of the vehicle-solvent to evaporate to a point at which the formulation is reasonably tacky. The ultrasonic crystal or other object to be adhered is then put in place. The apparent viscosity of the formulation with full solvent load is about 500 to 1000 centistokes measured at 77° F while after solvent release the viscosity will be about $10^4$ to $10^6$ centistokes.

Another embodiment of the present invention is a conductive version. The conductive version is particularly suitable as an ultrasonic couplant since the adhesive then forms one of the electrical contacts to the crystal. However, the conductive agent for use in a radiation environment must have a relatively low neutron capture cross-section so that the conductive material will not undergo activation. The recoil energies of the activation by-products could cause damage to the adhesive. For this reason palladium is the preferred conductive agent. Other metals which will withstand a high neutron flux are rhodium and ruthenium. Carbon or graphite will also withstand a high neutron flux but its conductivity is lower. Metals which can be used in locations where there is a moderate neutron flux are nickel and molybdenum while the metals suitable in areas of low neutron flux are platinum, iridium and tungsten. Metals which will oxidize such as aluminum and copper cannot be used effectively. Alloys of palladium may also be used such as alloys containing cobalt, molybdenum or nickel.

In order to obtain a conductive product, the finely divided conductive agent is added to the mixture of the carborane polysiloxane adhesive and the vehicle-solvent after cooling to room temperature. The wetting agent is either added to the room temperature mixture before the addition of the conductive agent or it may be slurried with a mixture of conductive agent and vehicle-solvent and the slurry then added to the room temperature mixture. The conductive agent is preferably in powder form and has a particle size on the order of −325 mesh, +400 mesh. One example of a conductive version of the invention employing a single carborane polysiloxane adhesive is as follows:

| Component | Function | Preferred Volume % | Range Volume % |
|---|---|---|---|
| Carborane Methyl Silicone | Adhesive | 14.00 | 11.0–25.0 |
| Palladium | Conductive Agent | 36.00 | 37.5–30.0 |
| Benzene | Vehicle-Solvent | 49.95 | 58.95–39.90 |
| Dimethyl Polyoxyalklene Ether Siloxane Copolymer | Wetting Agent | 0.05 | 0.05–0.10 |

Another example of a conductive version employing an adhesive formed from a mixture of carborane polysiloxanes is as follows:

| Component | Function | Preferred Volume % | Range Volume % |
|---|---|---|---|
| Carborane Methyl Silicone | Adhesive | 7.0 | 5.5–12.5 |
| Carborane Methyl Phenyl Silicone | Viscosity-Modifier | 7.0 | 5.5–12.5 |
| Diakyl Ethers | Vehicle-Solvent | 49.95 | 58.95–39.90 |
| Nickel | Conductive Agent | 36.00 | 37.5–30.0 |
| Some Other Wetting Agent | Wetting Agent | 0.05 | 0.05–0.10 |

A further embodiment of the present invention for use in high irradiation fields involves the use of a carborane polysiloxane adhesive in which the boron has been increased in $B^{11}$ and reduced in $B^{10}$ content. Boron naturally has an isotopic content of 18.34 weight percent $B^{10}$ and 81.66 weight percent $B^{11}$. The $B^{10}$ isotope has a high thermal neutron cross-sectional area ($\delta = 3840$ barns) and will absorb neutrons and selfactivate forming long-lived transmutation by-products. $B^{11}$ has a low thermal neutron cross-sectional area ($\delta = 5 \times 10^{-3}$ barns) and is a very poor neutron absorber and will not self-activate or transmutate. $B^{11}$ is stable in high irradiation fields. The production of the carborane polysiloxanes with increased $B^{11}$ content is accomplished by conventional isotope separation techniques to obtain the boron enriched in $B^{11}$ and then forming the carborane from such enriched boron.

What is claimed is:

1. A method of adhering and acoustically and electrically coupling an acoustic transducer to a surface wherein said coupling will be subject to high temperature and radiation comprising the steps of applying a layer of electrically conductive coupling material between said transducer and said surface and allowing said coupling material to cure by vehicle-solvent release to cause said transducer to be adhered and coupled to said surface, said coupling material comprising:
    a. a carborane polysiloxane adhesive;
    b. a vehicle-solvent for said carborane polysiloxane adhesive, said vehicle-solvent being evaporatable from said bonding material whereby said bonding material will cure by vehicle-solvent release;
    c. a wetting agent; and
    d. a conductive agent.

2. A method as recited in claim 1 wherein said conductive agent is selected from the group consisting of palladium, rhodium, ruthenium, graphite, nickel, molybdenum, platinum, iridium tungsten and tungsten carbide.

3. A method as recited in claim 1 wherein the boron content of said carborane polysiloxane adhesive is greater than 81.66 weight percent $B^{11}$.

4. A method as recited in claim 1 wherein the proportions of adhesive, vehicle-solvent, wetting agent and conductive agent are as follows:
    a. from 11.0 to 25.0 volume percent adhesive;
    b. from 58.95 to 39.90 volume percent vehicle-solvent;
    c. from 0.05 to 0.10 volume percent wetting agent; and
    d. from 37.5 to 30.0 volume percent conductive agent.

5. A method as recited in claim 4 wherein said carborane polysiloxane adhesive is a carborane methyl silicone polymer.

6. A method as recited in claim 5 wherein the proportions of adhesive, vehicle-solvent, wetting agent and conductive agent are about 14.00 volume percent adhesive, 49.95 volume percent vehicle solvent, 0.05 volume percent wetting agent and 36.00 volume percent conductive agent.

7. A method as recited in claim 5 wherein said coupling material further includes a viscosity modifier comprising a carborane polysiloxane having a lower viscosity than said caborane polysiloxane adhesive.

8. A method as recited in claim 7 wherein said carborane polysiloxane viscosity modifier is selected from the group consisting of carborane methyl phenyl silicone and carborane methyl 2-cyanoethyl silicone and mixtures thereof.

* * * * *